Dec. 21, 1948.  R. E. RESTALL  2,456,648
PASSENGER OPERATED ROUNDABOUT
Filed Nov. 18, 1946  5 Sheets-Sheet 1
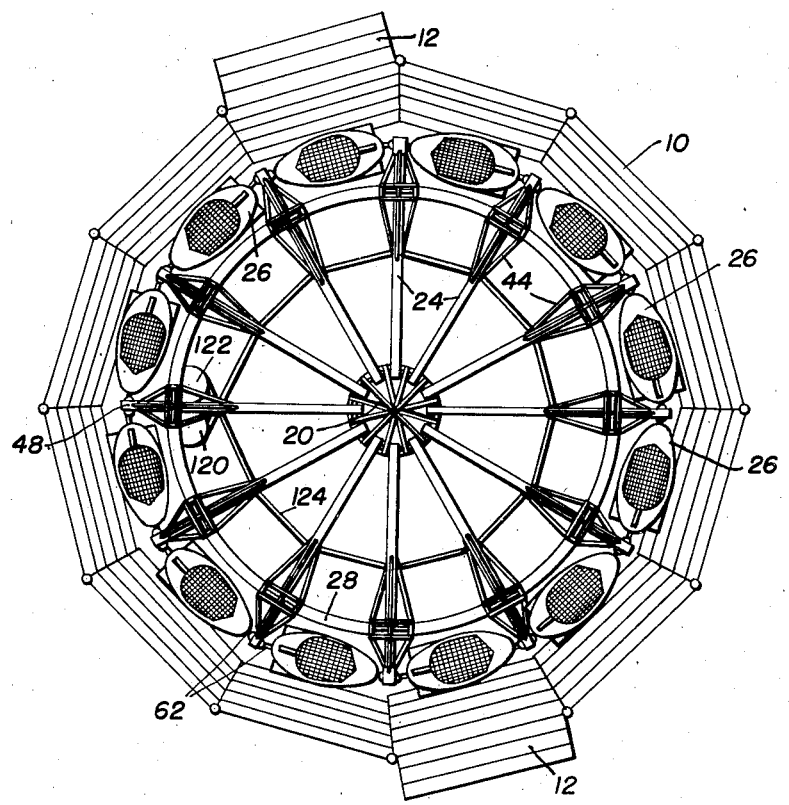
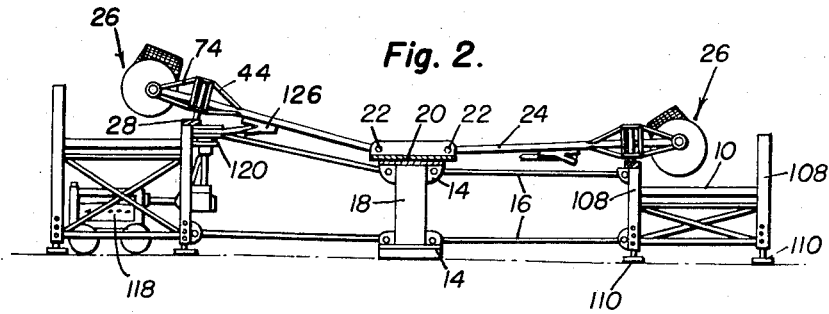
Inventor
Robert E. Restall
By *Clarence A. O'Brien and Harvey B. Jacobson*
Attorneys Dec. 21, 1948.  R. E. RESTALL  2,456,648
PASSENGER OPERATED ROUNDABOUT
Filed Nov. 18, 1946  5 Sheets-Sheet 2
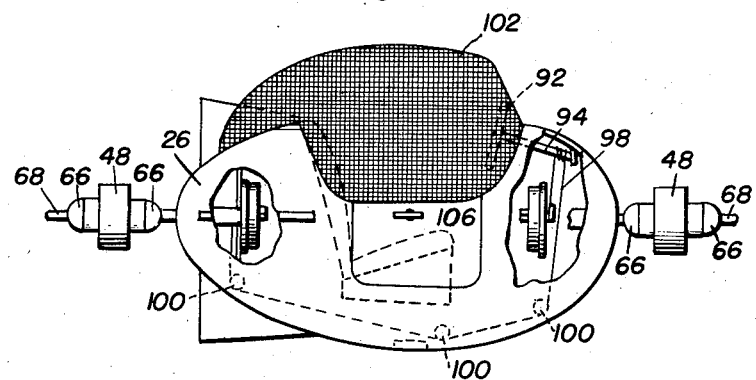
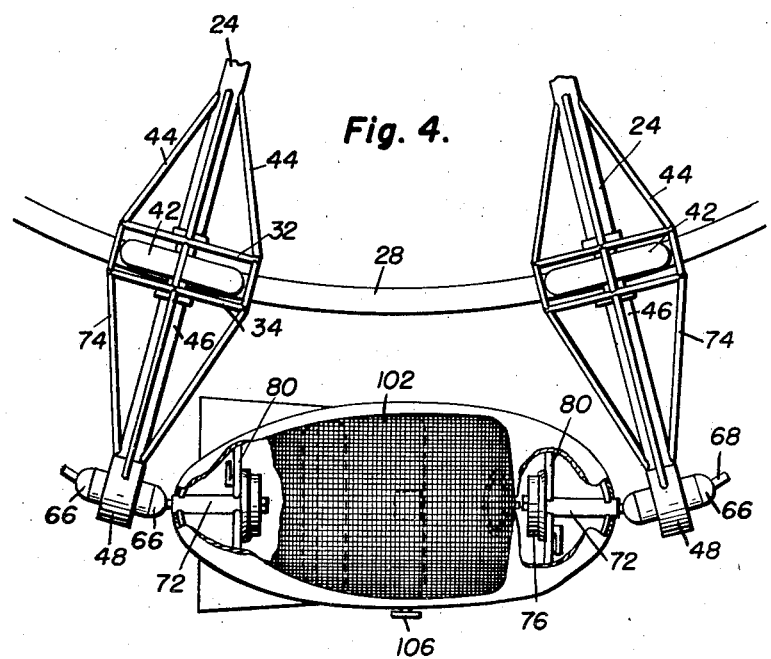
Inventor
Robert E. Restall
By *Clarence A. O'Brien and Harvey B. Jacobson*
Attorneys Dec. 21, 1948.    R. E. RESTALL    2,456,648
PASSENGER OPERATED ROUNDABOUT
Filed Nov. 18, 1946    5 Sheets-Sheet 3

*Inventor*
Robert E. Restall

By *Clarence A. O'Brien and Harvey B. Jacobson*
*Attorneys*

Dec. 21, 1948.   R. E. RESTALL   2,456,648
PASSENGER OPERATED ROUNDABOUT
Filed Nov. 18, 1946   5 Sheets-Sheet 4
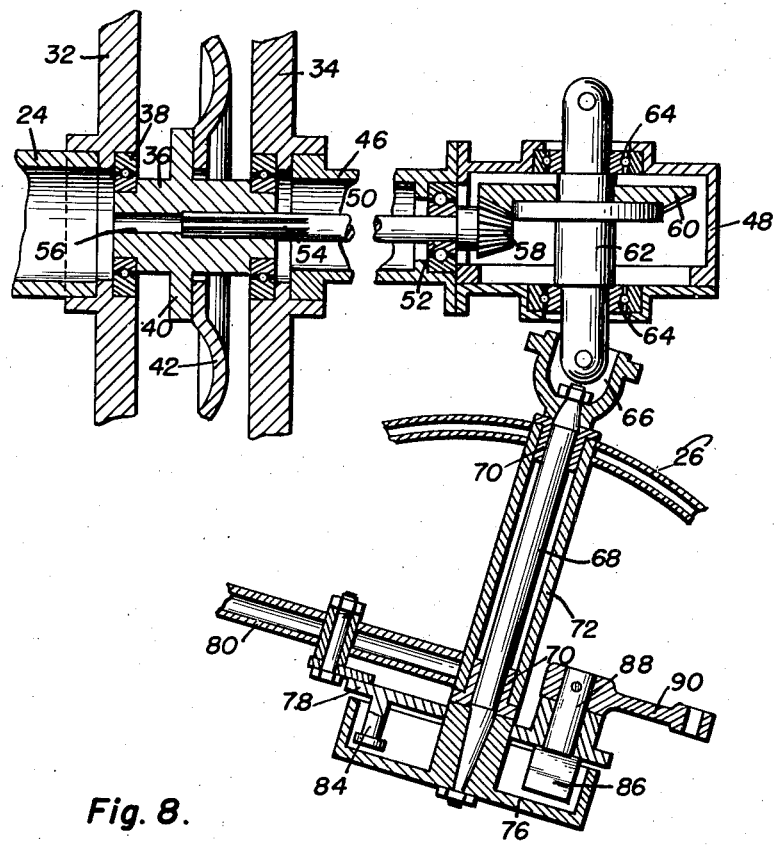
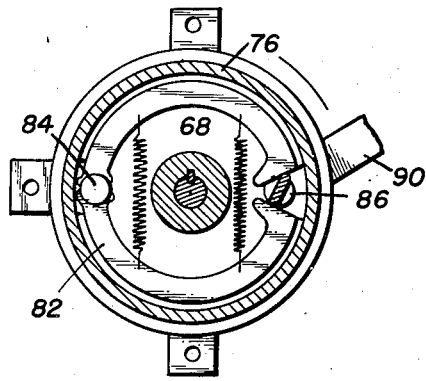
Inventor
Robert E. Restall Dec. 21, 1948.  R. E. RESTALL  2,456,648
PASSENGER OPERATED ROUNDABOUT
Filed Nov. 18, 1946  5 Sheets-Sheet 5
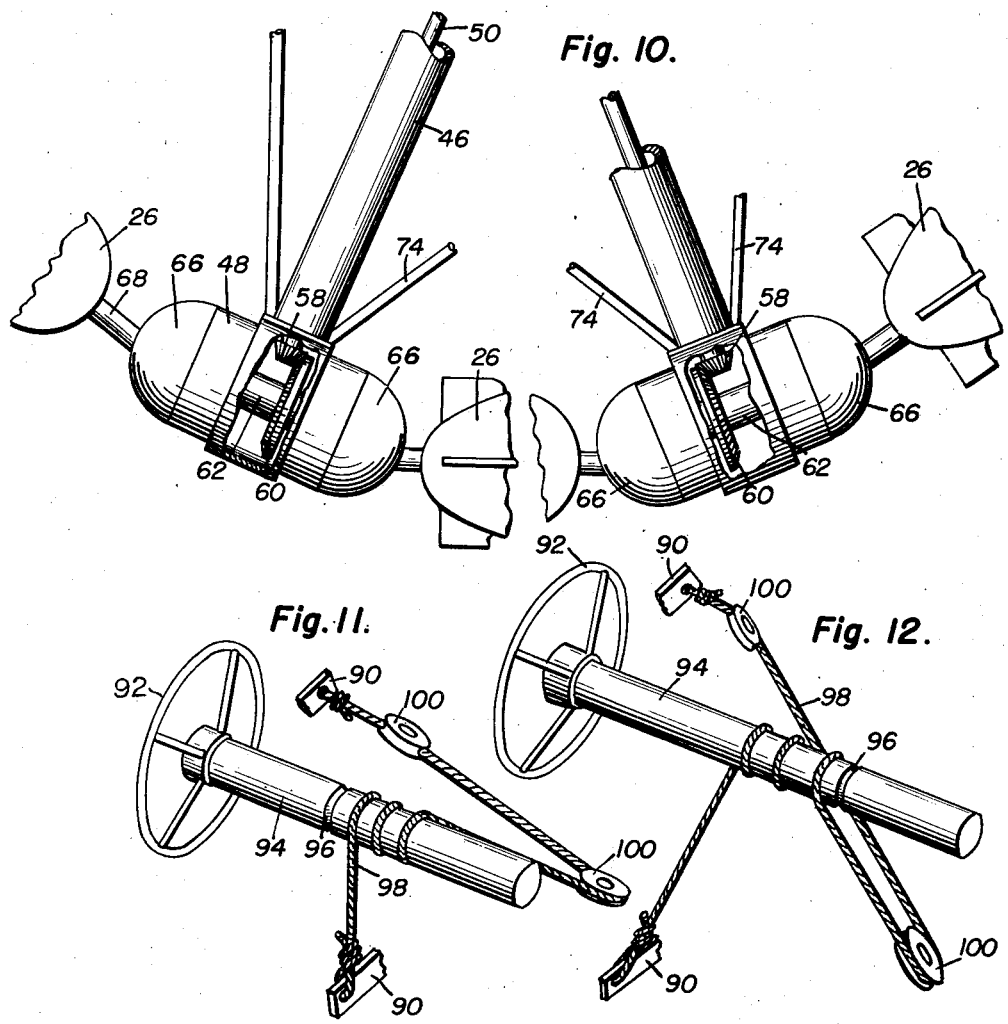
Inventor
Robert E. Restall
By *Clarence A. O'Brien and Harvey B. Jackson*
Attorneys Patented Dec. 21, 1948

2,456,648

UNITED STATES PATENT OFFICE 2,456,648

PASSENGER OPERATED ROUNDABOUT

Robert E. Restall, Hamilton, Ontario, Canada

Application November 18, 1946, Serial No. 710,709

9 Claims. (Cl. 272—36)

The present invention relates to novel and useful improvements in a passenger roundabout and more specifically pertains to an amusement device constituting a power operated ride and of the type wherein a variable motion may be imparted to the passenger vehicle at the will and under the control of the passengers.

The primary object of this invention is to provide an amusement ride device wherein a passenger operated vehicle is caused to travel about and upon an undulating track and wherein a variety of motions are imparted to the vehicle.

An important purpose of the invention resides in providing an amusement device in accordance with the foregoing object, wherein the passenger may be caused to travel in a circular path of an undulated character, and whereby a rocking motion may be imparted to the vehicle under the control of the passengers thereof.

Another important object of the invention is to provide an apparatus in conformity with the preceding objects wherein the passenger operated controls are rendered inoperative when the device is not in motion.

Still another object of the invention is to provide an amusement device in conformity with the foregoing objects wherein the rotary motion of the apparatus may be employed to develop a source of power for the effective selective individual motions of the vehicles in accordance with the desires of the passengers therein.

Yet another important object of the invention resides in the provision of a simplified but efficient control means whereby the passengers of a vehicle may control the operation thereof during the rotary progress of the vehicle.

And a final object of the invention, to be specifically enumerated herein, resides in the design and provision of an apparatus which shall be of simplified and sturdy construction, portable, relatively inexpensive to manufacture, readily assembled or disassembled and operated, and which will contribute to the enjoyment of the users by affording a wide field for the exercise of personal preference and skill in varying and controlling the motions of the passenger occupied vehicles.

These, together with various ancillary objects of the invention which will later become apparent as the following description proceeds, are realized by this invention, one embodiment of which has been illustrated, by way of example only, in the accompanying drawings, wherein like numerals indicate similar parts throughout the various views and wherein:

Figure 1 is a top plan view of the device, showing the general arrangement of passenger cars and supporting means;

Figure 2 is a transverse vertical sectional view through Figure 1;

Figure 3 is a side elevational view, parts being broken away to show more clearly the construction thereof, of one of the passenger cars and a portion of the supporting means therefor;

Figure 4 is a top plan view, parts being broken away to show the interior construction thereof, of the portion of the apparatus shown in Figure 3;

Figure 7 is a fragmentary detail view in horizontal section illustrating the construction of the car supporting and driving means in accordance with the invention;

Figure 8 is a vertical sectional view through one of the passenger operated power clutches within the cars;

Figure 10 is a fragmentary detail view in horizontal plan, parts being broken away to show the interior construction, of a portion of the driving mechanism and supporting means of the passenger cars;

Figure 11 is a perspective view of one of the passenger operated control means of one of the cars; and Figure 12 is a view similar to Figure 11 but of the passenger operated control means of an adjacent car.

Figure 5:
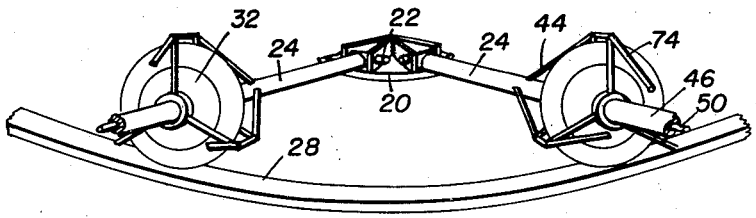
Figure 5 is a perspective view of a portion of the power producing and car supporting rollers of the invention.
Figure 6:
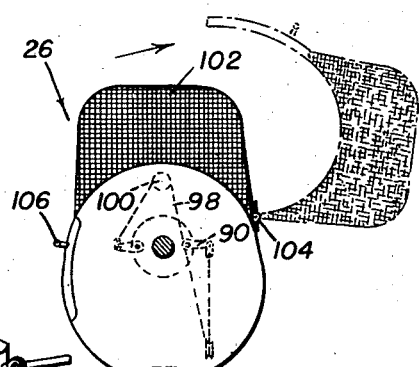
Figure 6 is a front elevational view of one of the passenger cars, illustrating the passenger enclosing cover or hood of the vehicle in both its open and closed position.

Referring now more specifically to Figures 1 and 2, the roundabout forming the subject of this invention is shown as including an annular raised platform 10 having the customary approach steps 12 and being of a vertically undulating contour as indicated at Figure 2. Centrally and axially of the circular platform 10, are provided upper and lower bearings or supports 14 suitably connected by braces 16 with the inner circumference of the platform 10, and vertically supporting and journaling therein a central axle shaft 18.

Suitably attached to the upper end of the vertical axle shaft 18 is an annular head plate 20 to which are suitably hinged as at 22 a plurality of radially extending arms 24 constituting the supporting means of the passenger cars indicated generally at 26. An undulating track annular runway 28 is disclosed upon the inner periphery of the platform 10 for a purpose to be later set forth.

Attention is next directed to Figures 4, 5 and 7 for a better understanding of the car supporting and rotating mechanism. A wheel cage, consisting of a pair of plates 32 and 34 has journaled therein an axle 36 supported as by ball bearing assemblies 38 upon the plates, and has an annular flange 40 integrally formed therewith upon which is supported a wheel 42 of any suitable construction and adapted to ride upon the undulating annular track 28. The plate 32 is securely carried by the outer end of the arm 24 and is rigidly supported thereon by suitable reinforcing members 44. It will be understood that a similar cage is provided for each of the radially arranged arms 24.

Attached to each cage at the outer side of the plate 34 thereof, is a tubular supporting housing 46 which is coaxial with the corresponding arm 24, and which has secured thereto, at its outer extremity, a gear housing 48, it being understood that one such gear housing is provided for each arm 24 with its aligned tubular extension 46.

A driving shaft 50 is housed within each of the tubular extensions 46, and is journaled therein as by a bearing assembly 52 at the outer end of the housing 46, while the opposite end of the drive shaft is splined as at 54 within an axial bore 56 of the axle member 36. The outer extremity of the drive shaft 50 extends within the gear housing 48 and is provided with a bevel gear 58 adapted to mesh with a crown gear 60 secured upon a lay shaft 62 journaled within the housing 48 as by bearings 64. The opposite extremities of the lay shaft 62 extend without the housing 48 and are connected as by universal joint couplings 66 with a pair of oppositely extending power take-off shafts 68 each journaled as at 70 within a supporting housing 72 extending into each end of each of the passenger cars 26.

From the foregoing, it will be readily seen that each of the passenger cars 26 is supported by means of their opposite extremities from the housing 72 and power take-off shaft 68 from the universal joint 66 connected to the adjacent gear casings 48 at the outer extremities of adjacent supporting arms 24.

As will be readily understood, when the head 20 and attached supporting arms 24 are rotated by a means to be subsequently set forth, the suspended cars 26 are likewise rotated in an undulating manner upon the circular track 28 by means of the supporting wheels 42. During this rotation, the supporting wheels 42 cause the rotation of the supporting axles 36, and by means of the driving shaft 50, gearing 58 and 60, lay shaft 62 and power take-off shaft 68 cause the selective rotation of the passenger cars under the control of the passengers thereof in a manner to be subsequently set forth.

At this point, attention is directed to Figure 10, wherein it will be seen that adjacent supporting arms with their tubular extensions 46, of the driving shaft 50 rotating in the same direction but have their lay shafts 62 rotating in opposite directions by reason of the reverse arrangement of the pinion and crown gears 58 and 60 respectively. By this arrangement, every other lay shaft is caused to rotate in a clockwise direction while the intermediate lay shafts are caused to rotate in a counter-clockwise direction. It will be seen that each of the cars 26 thus has in its opposite extremities a pair of power take-off shafts which support the car but rotate in opposite directions within the housing 72.

As will be readily seen from Figures 4 and 10, the gear casings 48 and tubular extensions 46 are rigidly connected to the cage plates 34 by means of suitable reinforcements 74.

Attention is now directed to Figures 3, 4, 7 and 8 for a better understanding of the control means for rotating the cars at the will of the passengers. Rigidly attached to the inner end of each of the power take-off shafts 68, is a clutch drum 76 while a clutch shoe supporting plate 78 is supported in juxtaposition to said drum upon suitable transverse partitions within the cars 26. As seen in Figure 4, these transverse partitions 80 are disposed at the front and rear ends of the car and are rigidly attached to the framework thereof. A conventional type of expanding clutch brake shoe 82 is pivotally mounted upon the supporting plate 78 as by means of an anchor or fulcrum pin 84, while the expanding ends of the brake shoe are operated by means of a cam 86 disposed upon a stub shaft 88 journaled in the supporting plate 78 and operated by a clutch lever 90.

It will now be seen that during the entire time the cars are rotating about the annular track, the power shafts 68 are rotated thus providing each car with oppositely rotating power take-off shafts at the opposite extremities thereof. By proper selective manipulation of the clutch levers 90 at the forward and rearward ends of the cars, it will be seen that the car may be selectively secured to either of the power take-off shafts 68 for rotation therewith by means of the locking or braking engagement between the brake drum 76, the brake shoes 82 which are secured upon the plate 78, thereby locking the tubular housing 72, the brake plate 78 and the partitions 80 with the attached cars 26, against rotation relative to the driving shafts 68.

It is desirable that a similar control means be provided in each car for selective control of the clutch levers 90 whereby the control means may be operated in the same direction in each car to produce the same motions throughout the various cars. For this purpose, the clutch lever actuating means indicated in Figures 11 and 12 is provided. As shown in Figure 3, and Figures 11 and 12, a suitable control wheel 92 is rigidly secured upon a control shaft 94 while the clutch control cable 98 is wound about a spiral groove 96 upon the control shaft and by means of suitable means 100 has its extremities attached to the operating levers 90 of the forward and rearward clutch assemblies above mentioned. The construction in Figure 3 is provided with a clutch lever operating means disclosed in detail in Figure 12. In both of the adjacent cars to the cars shown in Figure 3, however, it will be understood that the forward and rearward power take-off shafts are operating in a reverse direction to those of the car shown in Figure 3, by reason of the alternately reverse gearing arrangements shown in detail in Figure 10. Consequently, if the same control means shown in Figure 12 were applied to all of the cars, the same clockwise movement applied to the control wheel 92 would result in the adjacent cars moving in opposite directions. To avoid this disadvantageous characteristic, alternate cars are provided with the reversed control arrangement shown in Figure 11, wherein it will be noted that the control cable 98 is wound in a reverse manner upon the spiral groove 96 on the shafts 94, to cause a reversed operation of the clutch levers. Thus, it will be seen that a clockwise rotation of the wheel 92 of Figure 12 will wind up the portion of the cable 98 shown therebelow in Figure 12, while paying out the portions disposed thereabove. The clutch control levers and cables are so connected that a clockwise rotation of the wheel 92 with the cable arrangement shown in Figure 12, will result in a clockwise rotation of the car 26 upon its supports; while a counter-clockwise rotation of the wheel 92 will result in a reverse actuation of the control levers 90 and consequently cause a counter-clockwise rotation of the cars about their supports.

Any suitable construction of car may be employed within the purposes of this invention, although a preferred form will have a removable canopy or hood 102 pivoted to the side of the car as at 104 and provided with a manual locking means 106 disposed upon the outside of the car whereby the car may be opened or closed only from the outside, under the control of the operator of the device.

Figure 9:
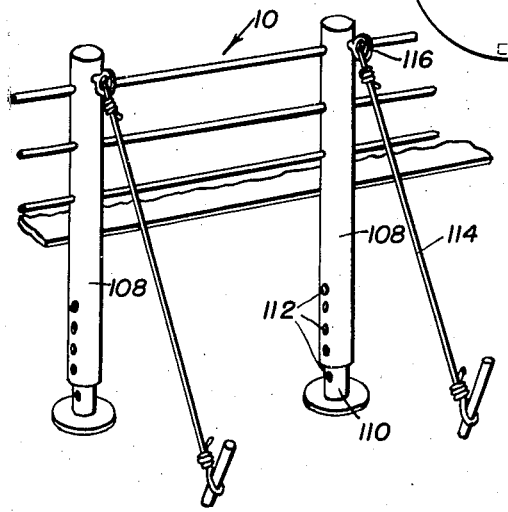
Figure 9 is a fragmentary detail in perspective illustrating a portion of the platform supporting rail and bracing of the device.

Attention is next directed to the details of construction shown in Figure 9, wherein it will be seen that the platform 10 is supported upon suitable standards 108, these standards having adjustable foot portions 110 which telescope within the hollow interior of the standards and may be adjustably secured therein as by means of pins or the like inserted in aligned spaced apertures 112 in these telescoping members. Upon the outer standards, suitable guy wires 114 may be provided for anchoring by means of eye bolts 116 the platform 10 to permit quickly engageable and disengageable rigid supporting means therefor.

From the foregoing, it will be seen that each of the cars may be rocked in a clockwise or counter-clockwise direction about its longitudinal axis under the control and at the will of the passengers thereof during the rotation of said cars about their annular track; and that the passenger operated control means may be energized only while the cars are in motion. It will also be noted that each of the cars is supported at its extremities upon a pair of oppositely rotating power take-off shafts each of which is driven by power drive shafts all rotating in the same direction and powered by the motion of the roundabout. By means of the oppositely rotating shafts in each car, it will be observed that a clutch means associated with each may be selectively operated by the passengers, one clutch being released while the other is engaged in alternative operation, to selectively cause the rotation of the car in predetermined direction. Finally, since it will be noted that adjacent cars have their forward power take-off supporting shafts rotating in opposite directions, it will be noted that a specialized control has been provided whereby the same operation of the control lever will result in the same motion of adjacent cars even though their power providing means rotates in different directions.

Although the principles of the invention may be effected by providing any suitable operating means for causing the rotation of the axial central shaft 1, a preferred form of actuating means is illustrated in Figures 1 and 2. A suitable prime mover, such as internal combustion engine 118, may be positioned beneath a portion of the platform 10 and by means of suitable gearing cause the rotation of a driving pulley 120. Disposed adjacent the driving pulley 120 is an idler pulley 122 yieldably urged away from the driving pulley by a spring means, not shown, for the purpose of taking up slack in the driving cable 124 which is entrained about these pulleys and tightly engaged within the V-shaped notches of a series of lugs 126, one of which is attached to the lower surface of each of the supporting arms 24. It will thus be seen that the tightly stretched cable 124 when caused to rotate by operation of the drive pulley 120 effects the rotation of the shaft 18, the head 20 and the attached supporting arms 24 by reason of the frictional engagement between the cable 124 and the driving brackets 126.

It will be readily understood that various attachments for the purpose of insuring the safety of the occupants of the cars may be employed with this invention, and that if desired any suitable rotation limiting means may be provided for preventing the complete rotation of the cars 26 about their longitudinal axes under the impulse imparted by the clutches at the control of the operator.

Since various modifications will readily occur to those skilled in the art, the invention is not to be limited to the exact construction shown and described, but all suitable modifications and equivalents may be resorted to within the scope of the appended claims.

What is claimed as new is as follows:

1. In an amusement device having a plurality of supporting arms radially disposed about a vertical axis of rotation and a plurality of passenger cars supported between adjacent arms, in combination, an annular undulating track, supporting wheels adjacent the extremities of said arms and riding on said track, said supporting wheels constituting a power source for effecting rotation of said cars about their longitudinal axes, and passenger operated means for controlling the rotation of said cars.

2. The combination of claim 1 wherein said arms are provided with tubular axial extensions, gear casings on the ends of said extensions, lay shafts extending laterally of said gear casings, gearing connecting said supporting wheels with said lay shafts, power take-off shafts connected to the extremities of said lay shafts, means for mounting said passenger cars upon adjacent power take-off shafts, and means for selectively causing rotation of said cars by one of said adjacent power take-off shafts.

3. The combination of claim 1 wherein said arms are provided with tubular axial extensions, gear casings on the ends of said extensions, lay shafts extending laterally of said gear casings, gearing connecting said supporting wheels with said lay shafts, power take-off shafts connected to the extremities of said lay shafts, means for mounting said passenger cars upon adjacent power take-off shafts, and means for selectively causing rotation of said cars by one of said adjacent power take-off shafts, said gearing being arranged to produce opposite rotation of adjacent lay shafts.

4. The combination of claim 1 wherein said arms are provided with tubular axial extensions, gear casings on the ends of said extensions, lay shafts extending laterally of said gear casings, gearing connecting said supporting wheels with said lay shafts, power take-off shafts connected to the extremities of said lay shafts, means for mounting said passenger cars upon adjacent power take-off shafts, and means for selectively causing rotation of said cars by one of said adjacent power take-off shafts, said gearing being arranged to produce opposite rotation of adjacent lay shafts, and clutch means in each car for coupling said car to each of said lay shafts supporting said car.

5. The combination of claim 1 wherein said arms are provided with tubular axial extensions, gear casings on the ends of said extensions, lay shafts extending laterally of said gear casings, gearing connecting said supporting wheels with said lay shafts, power take-off shafts connected to the extremities of said lay shafts, means for mounting said passenger cars upon adjacent power take-off shafts, and means for selectively causing rotation of said cars by one of said adjacent power take-off shafts, said gearing being arranged to produce opposite rotation of adjacent lay shafts, and clutch means in each car for coupling said car to each of said lay shafts supporting said car, and attaching means connected with each of said clutch means for alternate operation thereof from a common control.

6. The combination of claim 1 wherein said arms are provided with tubular axial extensions, gear casings on the ends of said extensions, lay shafts extending laterally of said gear casings, gearing connecting said supporting wheels with said lay shafts, power take-off shafts connected to the extremities of said lay shafts, means for mounting said passenger cars upon adjcent power take-off shafts, and means for selectively causing rotation of said cars by one of said adjacent power take-off shafts, said gearing being arranged to produce opposite rotation of adjacent lay shafts, and clutch means in each car for coupling said car to each of said lay shafts supporting said car, and attaching means connected with each of said clutch means for alternate operation thereof from a common control, said actuating means including a shaft, a cable wound upon said shaft, the ends of said cable being secured to the actuating levers of said clutch means.

7. The combination of claim 1 wherein said arms are provided with tubular axial extensions, gear casings on the ends of said extensions, lay shafts extending laterally of said gear casings, gearing connecting said supporting wheels with said lay shafts, power take-off shafts connected to the extremities of said lay shafts, means for mounting said passenger cars upon adjacent power take-off shafts, and means for selectively causing rotation of said cars by one of said adjacent power take-off shafts, said gearing being arranged to produce opposite rotation of adjacent lay shafts, said gearing including a drive shaft journaled in said tubular extension and connected to said supporting wheel, a first gear on said drive in said gear case, a second gear on said lay shaft in said gear case and meshing with said first gear, the second gears in adjacent gear cases engaging said first gears on opposite sides thereof for reverse rotation.

8. In an amusement device, a passenger car, means mounting said car at its forward and rear ends, said mounting means comprising oppositely rotating shafts, a clutch means in said car for frictionally securing said car selectively to each of said shafts, and passenger operated control means in said car for selectively actuating said clutch means in alternate relation.

9. In an amusement device, a passenger car, means mounting said car at its forward and rear ends, said mounting means comprising oppositely rotating shafts, a clutch means in said car for frictionally securing said car selectively to each of said shafts, and passenger operated control means in said car for selectively actuating said clutch means in alternate relation, said oppositely rotating shafts being operable by forward motion of said car.

ROBERT E. RESTALL.

REFERENCES CITED

The following references are of record in the file of this patent:

UNITED STATES PATENTS

| Number | Name | Date |
|---|---|---|
| 678,670 | Kling | July 16, 1901 |
| 2,423,283 | Austin | July 1, 1947 |

FOREIGN PATENTS

| Number | Country | Date |
|---|---|---|
| 525,057 | Germany | Oct. 21, 1928 |